US012706997B2

(12) United States Patent
Meng et al.

(10) Patent No.: US 12,706,997 B2
(45) Date of Patent: Aug. 11, 2026

(54) TRANSMISSION ASSEMBLY AND FOLDABLE ELECTRONIC DEVICE

(71) Applicant: HONOR DEVICE CO., LTD., Shenzhen (CN)

(72) Inventors: Yin Meng, Shenzhen (CN); Cheng Jiang, Shenzhen (CN); Shumin Liu, Shenzhen (CN); Feng Liang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 330 days.

(21) Appl. No.: 18/279,195

(22) PCT Filed: May 9, 2022

(86) PCT No.: PCT/CN2022/091797

§ 371 (c)(1),
(2) Date: Aug. 28, 2023

(87) PCT Pub. No.: WO2023/284386

PCT Pub. Date: Jan. 19, 2023

(65) Prior Publication Data

US 2024/0155048 A1 May 9, 2024

(30) Foreign Application Priority Data

Jul. 13, 2021 (CN) ........................ 202110790991.8

(51) Int. Cl.
*H04M 1/02* (2006.01)

(52) U.S. Cl.
CPC ................................ *H04M 1/0268* (2013.01)

(58) Field of Classification Search
CPC ............ H04M 1/0268; H04M 1/0216; H04M 1/0214; H05K 1/02; H05K 1/14;
(Continued)

(56) References Cited

U.S. PATENT DOCUMENTS

| | | | |
|---|---|---|---|
| 9,059,493 | B2 | 6/2015 | Tago et al. |
| 11,706,868 | B2 | 7/2023 | Gong |

(Continued)

FOREIGN PATENT DOCUMENTS

| | | | |
|---|---|---|---|
| CN | 103733741 | A | 4/2014 |
| CN | 104347154 | A | 2/2015 |

(Continued)

*Primary Examiner* — Anthony S Addy
(74) *Attorney, Agent, or Firm* — WOMBLE BOND DICKINSON (US) LLP

(57) ABSTRACT

Provided in embodiments of this application are a transmission assembly and a foldable electronic device. The transmission assembly includes a first transmission assembly. The first transmission assembly is configured for use in a bending area of the foldable electronic device. The first transmission assembly includes at least two first conductive layers and a first transmission layer located between the two first conductive layers. Each first conductive layer includes at least a first conductive fabric, and the first transmission layer includes at least one first signal line. A dielectric layer is further arranged between the first conductive layer and the first transmission layer, and the dielectric layer includes at least a first substrate layer.

19 Claims, 12 Drawing Sheets

(58) Field of Classification Search
CPC . H05K 9/00; H01R 12/72; H01B 7/18; H01B 7/36; H01B 7/282; H01B 7/08; H01Q 1/38; H04B 1/38; G06F 1/16; G06F 1/1616; G06F 1/1652; H01L 23/538; A45C 13/10; G09F 9/301
See application file for complete search history.

(56) References Cited

U.S. PATENT DOCUMENTS

| | | | | |
|---|---|---|---|---|
| 2012/0306705 | A1 | 12/2012 | Sakurai et al. | |
| 2018/0108826 | A1 | 4/2018 | Tajitsu et al. | |
| 2022/0408548 | A1* | 12/2022 | Niu | G06F 3/04164 |
| 2024/0155761 | A1* | 5/2024 | Xiao | G06F 3/04164 |
| 2025/0106314 | A1* | 3/2025 | Wu | H04M 1/0214 |

FOREIGN PATENT DOCUMENTS

| | | | |
|---|---|---|---|
| CN | 105845222 | A | 8/2016 |
| CN | 107044052 | A | 8/2017 |
| CN | 207802505 | U | 8/2018 |
| CN | 110177160 | A | 8/2019 |
| CN | 111430864 | A | 7/2020 |
| CN | 111491441 | A | 8/2020 |
| CN | 211457495 | U | 9/2020 |
| CN | 111883923 | A | 11/2020 |
| CN | 112002257 | A | 11/2020 |
| CN | 212135987 | U | 12/2020 |
| CN | 212303125 | U | 1/2021 |
| CN | 112817471 | A | 5/2021 |
| CN | 113572872 | A | 10/2021 |

* cited by examiner

TRANSMISSION ASSEMBLY AND FOLDABLE ELECTRONIC DEVICE

CROSS-REFERENCE TO RELATED APPLICATIONS

This application is a National Stage of International Application No. PCT/CN2022/091797 filed on May 9, 2022, which claims priority to Chinese Patent Application No. 202110790991.8 filed on Jul. 13, 2021, both of which are incorporated herein by references in their entireties.

TECHNICAL FIELD

Embodiments of this application relate to the technical field of terminals, and in particular, to a transmission assembly and a foldable electronic device.

BACKGROUND

As communication technologies develop rapidly, increasingly high signal transmission performance inside communication devices is required. For example, current communication devices are developing in a multi-antenna trend. For a foldable communication device, generally, an antenna can be arranged on only one side. If the antenna is required to be arranged on another side, a transmission assembly for signal transmission needs to extend through a rotating shaft assembly to be connected to circuit boards on two sides. In this case, bending resistance and loss resistance of the transmission assembly are required to be extremely high.

An electronic device, for example, a foldable screen mobile phone is used. In the prior art, a transmission assembly is usually arranged on the foldable screen mobile phone. One end of the transmission assembly is connected to a circuit board on one side of the foldable screen mobile phone, and another end of the transmission assembly extends through a rotating shaft assembly and is connected to a circuit board on another side of the foldable screen mobile phone. The transmission assembly located in an area of the rotating shaft assembly (that is, a bend of the transmission assembly) is configured as a grid shape, to reduce stress concentration points during folding, thereby increasing flexibility of the transmission assembly. In this way, the transmission assembly can be easily bent.

However, through the above solution, the bending resistance of the transmission assembly is still poor, resulting in poor reliability of the transmission assembly when the transmission assembly is used in a foldable screen device and a failure to satisfy performance requirements for a transmission assembly required in the foldable screen device.

SUMMARY

Embodiments of this application provide a transmission assembly and a foldable electronic device. By virtue of the embodiments of this application, bending resistance of a transmission assembly can be improved, so that reliability of the transmission assembly when the transmission assembly is used in a foldable screen device is improved, thereby satisfying performance requirements for a transmission assembly required in the foldable screen device.

According to a first aspect, this embodiment of this application provides a transmission assembly. The transmission assembly is configured for use in a foldable electronic device, and the transmission assembly includes a first transmission assembly, where the first transmission assembly is configured for use in a bending area of a foldable electronic device. The first transmission assembly includes at least two first conductive layers and a first transmission layer located between the two first conductive layers. Each of the first conductive layers includes at least a first conductive fabric. The first transmission layer includes at least one first signal line. A dielectric layer is further arranged between the first conductive layer and the first transmission layer, and the dielectric layer includes at least a first substrate layer.

In the transmission assembly provided in this embodiment of this application, by arranging the first conductive fabric, the first conductive fabric has good tensile performance during bending of the first transmission assembly, which can improve bending resistance of the first transmission assembly, thereby enhancing reliability of the transmission assembly when the transmission assembly is used in a foldable screen device, and meeting performance requirements for transmission assemblies required in foldable screen devices.

In a possible implementation, the first conductive layer further includes a first conductive adhesive layer located between the first conductive fabric and the dielectric layer. The first conductive adhesive layer is configured to bond the first conductive fabric to the dielectric layer.

In a possible implementation, the first conductive fabric and the first conductive adhesive layer are integrally formed. The integral formation of the first conductive fabric and the first conductive adhesive layer can ensure the reliability of the first conductive layer.

In a possible implementation, the first conductive fabric includes a first base layer and a conductive material arranged on the first base layer. A tensile strength of the first base layer is greater than 360 Mpa. In this way, the first base layer with the tensile strength greater than 360 Mpa can ensure the tensile performance of the first conductive fabric, and the conductive material arranged on the first base layer can ensure the conductivity of the first conductive fabric.

In a possible implementation, the first base layer is made of a polyester fiber. The polyester fiber is a synthetic fiber obtained by spinning polyester obtained by polycondensation of organic dibasic acid and dibasic alcohol, which has excellent wrinkle resistance and shape retention, and high strength and elastic restorability, and is durable.

In a possible implementation, the conductive material is any one or more of copper, gold, and nickel.

In a possible implementation, a thickness of the first conductive layer is in a range of 0.01 mm to 0.1 mm.

In a possible implementation, the first transmission layer further includes at least one first ground wire. At least one first ground wire is arranged on each of two sides of each of the first signal lines.

In a possible implementation, a distance between the first signal line and the first ground wire is greater than a distance between the first signal line and the first conductive layer.

In a possible implementation, the dielectric layer further includes an insulating layer located between the first conductive layer and the first substrate layer.

In a possible implementation, the insulating layer includes a first insulating adhesive layer. The first insulating adhesive layer is located between the first conductive layer and the first substrate layer. By arranging the first insulating adhesive layer between the first conductive layer and the first substrate layer, a thickness of the first substrate layer can be appropriately reduced, and the first insulating adhesive layer has better tensile performance compared with the first substrate layer, thereby enhancing bending resistance of the first transmission assembly.

In a possible implementation, the insulating layer includes an insulating fabric and a second insulating adhesive layer, and the second insulating adhesive layer is located between the insulating fabric and the first substrate layer. The insulating fabric has good tensile performance, which can further optimize the bending resistance of the first transmission assembly.

In a possible implementation, the insulating fabric is made of a polyester fiber.

In a possible implementation, the insulating layer includes a foamed layer and a third insulating adhesive layer, and the third insulating adhesive layer is located between the foamed layer and the first substrate layer.

In a possible implementation, the foamed layer is a closed-cell foam, a semi-closed-cell foam, or a foamed material. The closed-cell foam, the semi-closed-cell foam, or the foamed material has excellent resilience and retention.

In a possible implementation, the foamed material is a composite material formed of polytetrafluoroethylene, polyurethane, or a copolymer of polytetrafluoroethylene and fluorinated ethylene propylene. Polytetrafluoroethylene has excellent chemical stability, corrosion resistance, sealing performance, high lubrication and non-stickiness, electrical insulation, and good aging resistance. Polyurethane is a thermoplastic linear structure with good stability, chemical resistance, resilience and mechanical properties, and has less compression deformation. The copolymer of polytetrafluoroethylene and fluorinated ethylene propylene has good processability of thermoplastics.

In a possible implementation, a thickness of the insulating layer is in a range of 0.04 mm to 0.1 mm.

In a possible implementation, a thickness of the first substrate layer is in a range of 0.012 mm to 0.025 mm.

In a possible implementation, a plurality of notches are provided on the first signal line, and the plurality of notches are arranged at intervals in a bending direction perpendicular to the first transmission assembly.

In a possible implementation, the transmission assembly further includes a second transmission assembly. The second transmission assembly is connected to the first transmission assembly, and is configured for use in a non-bending area of the foldable electronic device. The second transmission assembly includes at least two first ground layers and a second transmission layer located between the two first ground layers. The second transmission layer includes a second signal line. A second substrate layer is further arranged between each of the first ground layers and the second transmission layer. The first ground layer is connected to the first conductive layer, the second transmission layer is connected to the first transmission layer, and the second substrate layer is connected to the first substrate layer.

When the second transmission assembly in the transmission assembly is configured for use in the non-bending area in the foldable electronic device, structural strength and stability of the transmission assembly corresponding to the non-bending area can be ensured. When the first transmission assembly in the transmission assembly is configured for use in the bending area of the foldable electronic device, the conductive fabric is arranged in the first transmission assembly as the ground layer, which can ensure the bending resistance and reliability of the transmission assembly corresponding to the bending area.

In a possible implementation, the second transmission layer and the first transmission layer are integrally arranged, and the second substrate layer and the first substrate layer are integrally arranged. In this way, reliability of signal transmission between the first transmission assembly and the second transmission assembly can be ensured.

In a possible implementation, the first conductive layer is connected to a side of the first ground layer facing away from the second substrate layer. The first conductive layer of the first transmission assembly is connected to the first ground layer of the second transmission assembly, which can ensure the performance of signal transmission between the first transmission assembly and the second transmission assembly.

In a possible implementation, a connection area between the first conductive layer and the first ground layer is greater than or equal to 20 $mm^2$. In this way, the reliability of signal transmission between the first transmission assembly and the second transmission assembly can be further ensured.

In a possible implementation, a thickness of the dielectric layer is set such that a first distributed capacitance is formed between the first conductive layer and the first signal layer, and the first distributed capacitance causes an impedance of the first transmission assembly to match an impedance of the second transmission assembly.

A distributed capacitance is formed between the first conductive layer and the first signal layer. Increasing the thickness of the dielectric layer can increase the distributed capacitance, and the impedance of the first transmission assembly is related to the distributed capacitance. Increasing the distributed capacitance can reduce the impedance of the first transmission assembly. In this way, when the thickness of the dielectric layer reaches a preset value, the first distributed capacitance is formed between the first conductive layer and the first signal layer, and the first distributed capacitance can cause the impedance of the first transmission assembly to match the impedance of the second transmission assembly.

In a possible implementation, when the impedance of the second transmission assembly is 50Ω, the thickness of each dielectric layer is set to 0.107 mm, a thickness of the first signal layer is 12 μm, and a dielectric constant c of the dielectric layer is 2.9, and when a transmission frequency is 2000 MHz, the first distributed capacitance is formed between the first conductive layer and the first signal layer, and the first distributed capacitance causes the impedance of the first transmission assembly to be 50Ω.

In a possible implementation, a weaving density of the first conductive fabric of the first conductive layer is set such that a second distributed capacitance is formed between the first conductive layer and the first signal layer, and the second distributed capacitance causes an impedance of the first transmission assembly to match an impedance of the second transmission assembly.

A distributed capacitance is formed between the first conductive layer and the first signal layer. Increasing the weaving density of the first conductive fabric of the first conductive layer can increase the distributed capacitance, and the impedance of the first transmission assembly is related to the distributed capacitance. Increasing the distributed capacitance can reduce the impedance of the first transmission assembly. In this way, when the weaving density of the first conductive fabric of the first conductive layer reaches a preset value, the second distributed capacitance is formed between the first conductive layer and the first signal layer, and the second distributed capacitance can cause the impedance of the first transmission assembly to match the impedance of the second transmission assembly.

In a possible implementation, a dielectric constant of the dielectric layer is set such that a third distributed capacitance is formed between the first conductive layer and the first signal layer, and the third distributed capacitance causes an impedance of the first transmission assembly to match an impedance of the second transmission assembly.

A distributed capacitance is formed between the first conductive layer and the first signal layer. Decreasing the dielectric constant of the dielectric layer can increase the distributed capacitance, and the impedance of the first transmission assembly is related to the distributed capacitance. Increasing the distributed capacitance can reduce the impedance of the first transmission assembly. In this way, when the dielectric constant of the dielectric layer reaches a preset value, the third distributed capacitance is formed between the first conductive layer and the first signal layer, and the third distributed capacitance can cause the impedance of the first transmission assembly to match the impedance of the second transmission assembly.

In a possible implementation, when the impedance of the second transmission assembly is 50Ω, the dielectric constant of the dielectric layer is set to 2, a thickness of each dielectric layer is set to 0.039 mm, and a thickness of the first signal layer is 12 μm, and when a transmission frequency is 2000 MHz, the third distributed capacitance is formed between the first ground layer and the first signal layer, and the third distributed capacitance causes the impedance of the first transmission assembly to be 50Ω.

According to a second aspect, this embodiment of this application further provides a transmission assembly. The transmission assembly is configured for use in a foldable electronic device, and the transmission assembly includes a first transmission assembly, where the first transmission assembly is configured for use in a bending area of a foldable electronic device. The first transmission assembly includes at least a second conductive layer, a third transmission layer, and a third substrate layer located between the second conductive layer and the third transmission layer. The third transmission layer includes third signal lines arranged at intervals and second ground wires located on two sides of each of the third signal lines, and the second ground wire extends through the third substrate layer and is connected to the second conductive layer. The second conductive layer includes a second conductive fabric.

In the transmission assembly provided in this embodiment of this application, by arranging the second conductive layer as the second conductive fabric, the second conductive fabric has good tensile performance during bending of the first transmission assembly, which can improve bending resistance of the first transmission assembly, thereby enhancing reliability of the transmission assembly when the transmission assembly is used in a foldable screen device, and meeting performance requirements for transmission assemblies required in foldable screen devices.

In a possible implementation, the transmission assembly further includes a second transmission assembly. The second transmission assembly is connected to the first transmission assembly, and is configured for use in a non-bending area of the foldable electronic device. The second transmission assembly includes at least a second ground layer, a fourth transmission layer, and a fourth substrate layer located between the second ground layer and the fourth transmission layer. The second ground layer is connected to the second conductive layer, the fourth transmission layer is connected to the third transmission layer, and the fourth substrate layer is connected to the third substrate layer.

When the second transmission assembly in the transmission assembly is configured for use in the non-bending area in the foldable electronic device, structural strength and stability of the transmission assembly corresponding to the non-bending area can be ensured. When the first transmission assembly in the transmission assembly is configured for use in the bending area of the foldable electronic device, the second conductive layer in the first transmission assembly is a conductive fabric, which can ensure the bending resistance and reliability of the transmission assembly corresponding to the bending area.

In a possible implementation, the fourth transmission layer and the third transmission layer are integrally arranged, and the fourth substrate layer and the third substrate layer are integrally arranged. In this way, reliability of signal transmission between the first transmission assembly and the second transmission assembly can be ensured.

In a possible implementation, the second transmission assembly further includes a third ground layer and a fifth substrate layer. The fourth transmission layer is located between the fourth substrate layer and the fifth substrate layer, and the fifth substrate layer is located between the fourth transmission layer and the third ground layer. In this way, the structural strength and stability of the second transmission assembly corresponding to the non-bending area can be further improved.

According to a third aspect, this embodiment of this application further provides a foldable electronic device. The foldable electronic device includes a first structural member and a second structural member. a bending area is formed between the first structural member and the second structural member. The first structural member includes at least a first circuit board, and the second structural member includes at least a second circuit board. The foldable electronic device further includes any one of the transmission assemblies described above. One end of the transmission assembly is connected to the first circuit board, and another end of the transmission assembly is connected to the second circuit board.

The foldable electronic device provided in this embodiment of this application includes at least a transmission assembly. In the transmission assembly, by arranging the first conductive fabric, the first conductive fabric has good tensile performance during bending of the first transmission assembly, which can improve bending resistance of the first transmission assembly, thereby enhancing reliability of the transmission assembly when the transmission assembly is used in a foldable screen device, and meeting performance requirements for transmission assemblies required in foldable screen devices.

In a possible implementation, the transmission assembly includes a first transmission assembly and a second transmission assembly connected to the first transmission assembly. The first transmission assembly is configured for use in a bending area of the foldable electronic device, and the second transmission assembly is configured for use in a non-bending area of the foldable electronic device. Since the first transmission assembly has bending resistance, when the first transmission assembly is configured for use in a corresponding area of a rotating shaft assembly that needs to be bent, the use reliability of the transmission assembly can be ensured.

DESCRIPTIONS OF REFERENCE NUMERALS

Figure 1:
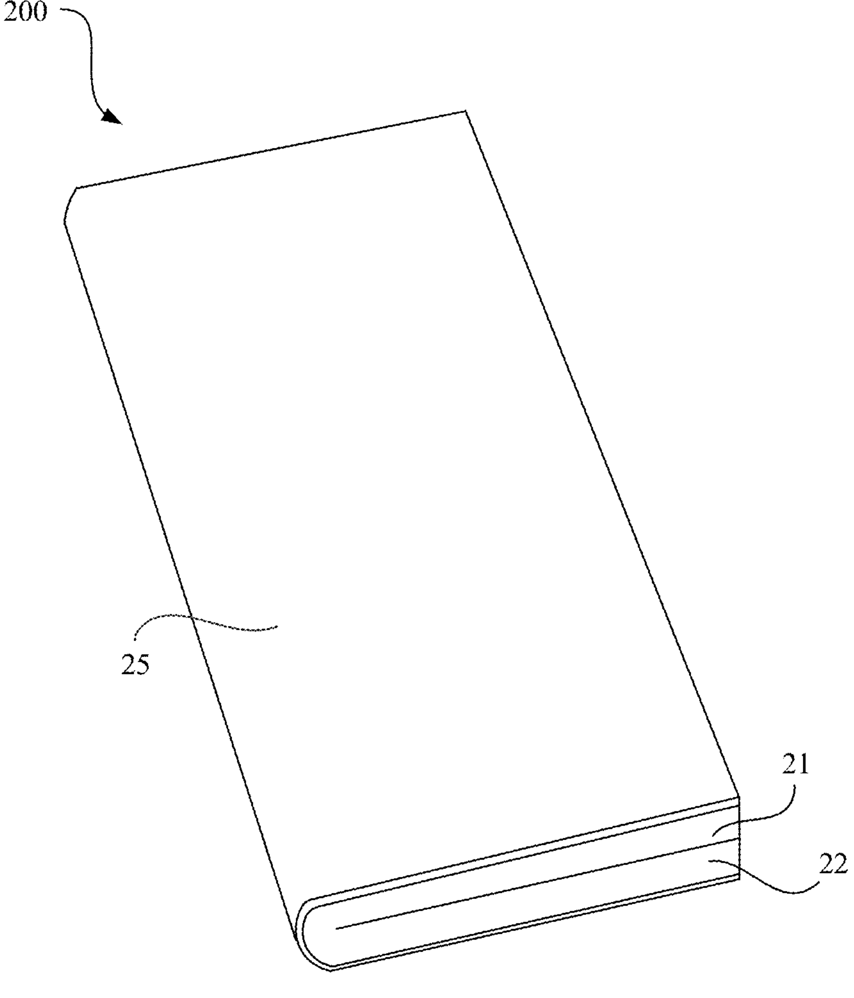
FIG. 1 is a three-dimensional schematic structural diagram of a foldable screen mobile phone according to an embodiment of this application in a folded state.

100—Transmission assembly; 10—First transmission assembly; 11—First conductive layer;
111—First conductive fabric; 112—First conductive adhesive layer; 12—First transmission layer;
121—First signal line; 122—First ground wire; 1211—Notch;
13—Dielectric layer; 131—First substrate layer; 132—Insulating layer;
1321—First insulating adhesive layer; 1322—Insulating fabric; 1323—Second insulating adhesive layer;
1324—Foamed layer; 1325—Third insulating adhesive layer; 20—Second transmission assembly;
201—First ground layer; 202—Second transmission layer; 2021—Second signal line;
2022—Fourth ground wire; 203—Second substrate layer; 204—First bonding layer;
205—First cover layer; 301—Second conductive layer; 3011—Second conductive fabric;
3012—Second conductive adhesive layer; 302—Third transmission layer; 3021—Third signal line;
3022—Second ground wire; 303—Third substrate layer; 401—Second ground layer;
402—Fourth transmission layer; 4021—Fourth signal line; 4022—Third ground wire;
403—Fourth substrate layer; 404—Third ground layer; 405—Fifth substrate layer;
50—Second cover layer; 60—Second bonding layer; 200—Foldable screen mobile phone;
210—Bending area; 21—First structural member; 211—First circuit board;
212—First battery; 22—Second structural member; 221—Second circuit board;
222—Second battery; 23—Rotating shaft assembly; 231—Rotating shaft;
232—First connecting member; 233—Second connecting member; 24—Display;
25—Rear cover; and 26—Flexible circuit board.

DESCRIPTION OF EMBODIMENTS

Terms used in implementations of this application are only used for explaining specific embodiments of this application, and are not intended to limit this application. The implementations of the embodiments of this application are described in detail below with reference to the accompanying drawings.

As flexible display technologies gradually become mature, a display mode of electronic devices changes significantly. For example, foldable electronic devices such as foldable mobile phones and foldable computers appear. Efficiency of information exchange can be doubled merely by simple folding of the foldable electronic devices. Future designs such as multiple folding and scrolling can completely change a way of information exchange. In addition, modes of displays of the foldable electronic devices can be flexibly changed and switched in different use scenarios, and the displays have a high screen-to-body ratio and definition. For example, a foldable mobile phone can be as small as a traditional mobile phone after being folded, which is portable, and can be as large as a tablet computer after being unfolded. Due to these characteristics, the foldable electronic devices become one of the most popular products.

An embodiment of this application provides a foldable electronic device. The foldable electronic device may include, but is not limited to, a mobile phone, a tablet computer, a notebook computer, an ultra-mobile personal computer (ultra-mobile personal computer, UMPC), a handheld computer, a walkie-talkie, a netbook, a point of sales (point of sales, POS) machine, a personal digital assistant (personal digital assistant, PDA), a wearable device, a virtual reality device, a wireless USB flash disk, a Bluetooth audio/headset, or a mobile or stationary terminal having a transmission assembly, such as an on-board front-mounted device, a driving recorder, or a security device.

Figure 2:
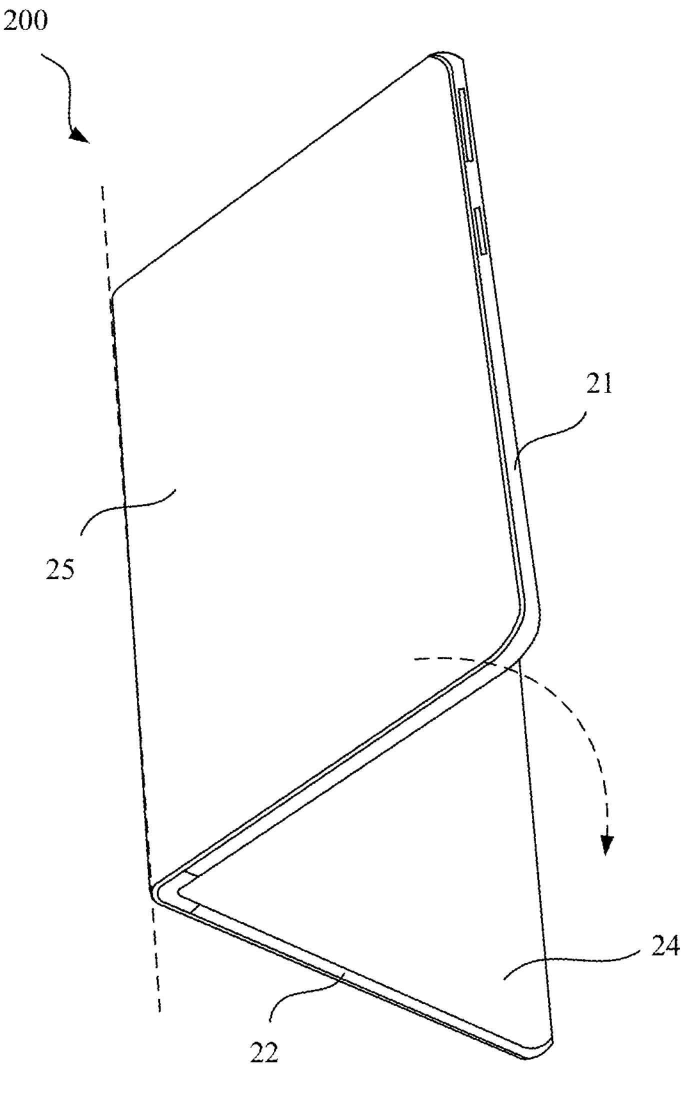
FIG. 2 is a three-dimensional schematic structural diagram of a foldable screen mobile phone according to an embodiment of this application in a half-folded state.
Figure 3:
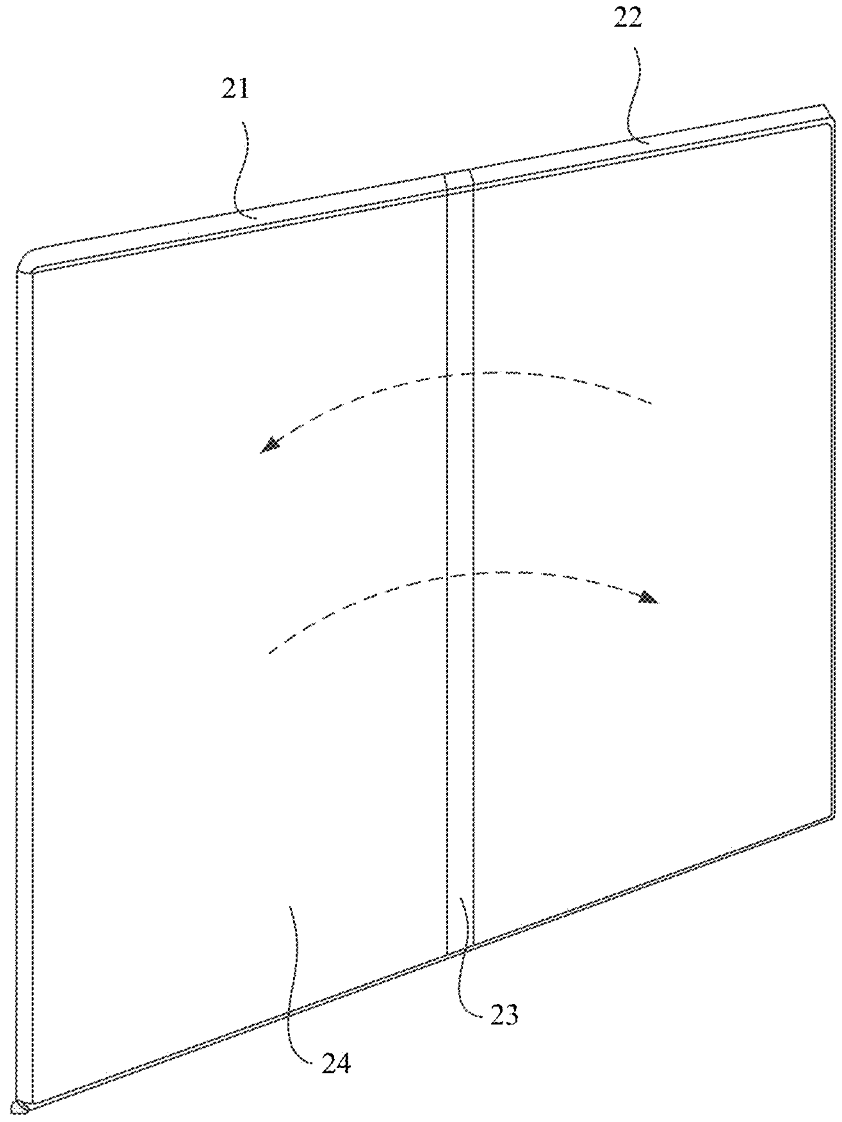
FIG. 3 is a three-dimensional schematic structural diagram of a foldable screen mobile phone according to an embodiment of this application in an unfolded state.

Referring to FIG. 1 to FIG. 3, for example, the foldable electronic device is a foldable screen mobile phone 200. The foldable screen mobile phone 200 may include a first structural member 21 and a second structural member 22. A bending area 210 is formed between the first structural member 21 and the second structural member 22 (refer to FIG. 4). For example, a rotating shaft assembly 23 may be arranged in the bending area 210. The rotating shaft assembly 23 is located between the first structural member 21 and the second structural member 22, and the first structural member 21 and the second structural member 22 are rotatably connected through the rotating shaft assembly 23.

Figure 4:
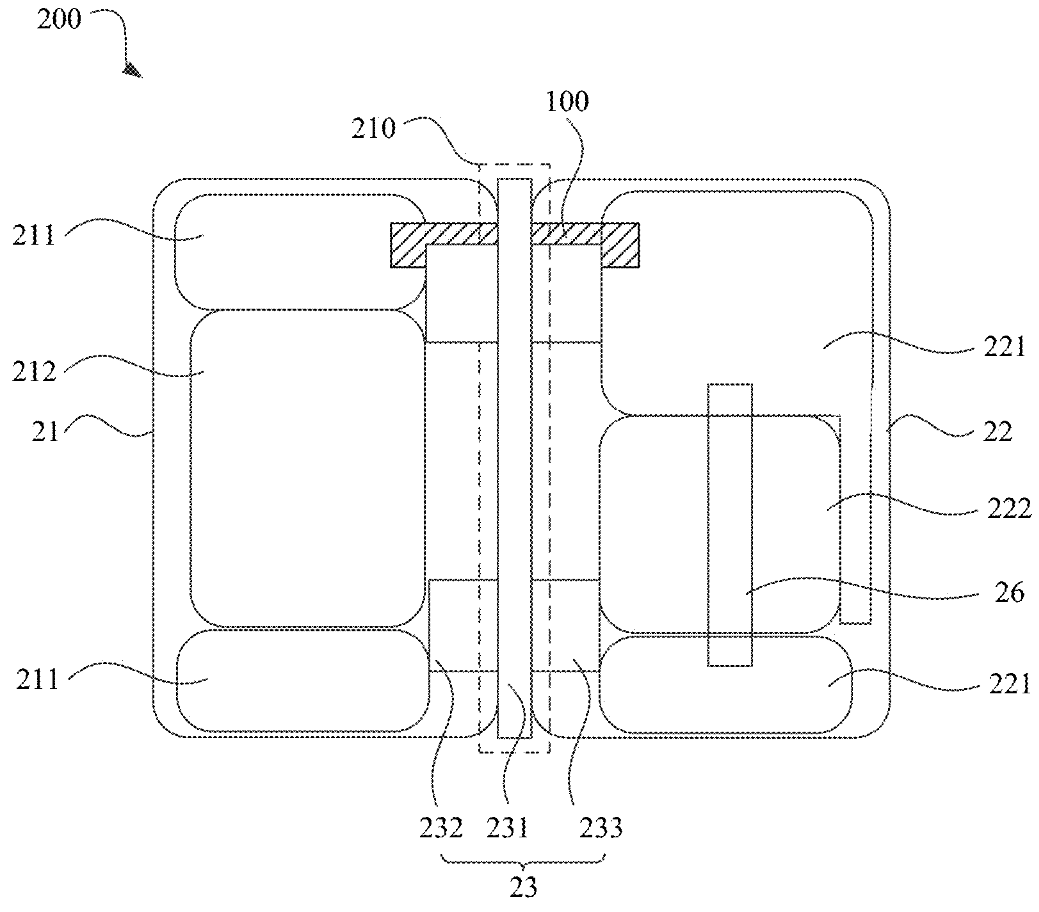
FIG. 4 is a schematic planar structural diagram of a foldable screen mobile phone according to an embodiment of this application.

Specifically, as shown in FIG. 4, the rotating shaft assembly 23 may include a rotating shaft 231 and a first connecting member 232 and a second connecting member 233 located on two sides of an axis of the rotating shaft 231. The rotating shaft 231 is rotatably connected to the first connecting member 232 and the second connecting member 233, the first connecting member 232 is fixedly connected to the first structural member 21, and the second connecting member 233 is fixedly connected to the second structural member 22, thereby realizing folding and unfolding of the first structural member 21 and the second structural member 22.

In this embodiment of this application, as shown in FIG. 2 or FIG. 3, the foldable screen mobile phone 200 may further include a display 24. The display 24 may be a flexible display, and the flexible display may cover one sides of the first structural member 21, the rotating shaft assembly 23, and the second structural member 22. In this way, the flexible display can be folded or unfolded correspondingly with rotation of the first structural member 21 and the second structural member 22. For example, when the first structural member 21 and the second structural member 22 are rotated toward each other into a folded state (refer to FIG. 1), the flexible display of the foldable screen mobile phone 200 is located between the first structural member 21 and the second structural member 22 in a folded state. When the first structural member 21 and the second structural member 22 are rotated away from each other into an unfolded state (see FIG. 3) until the first structural member 21 and the second structural member 22 are located on a same horizontal plane, the flexible display of the foldable screen mobile phone 200 is also in an unfolded state.

It should be noted that, there may be two (refer to FIG. 1 to FIG. 3) or more structural members in the foldable screen mobile phone 200, and when there are more than two structural members, adjacent structural members may rotate about rotating shaft assemblies 23 parallel to each other, thereby forming a multi-layer structural member. Alternatively, the structural members may be unfolded to obtain a larger display area. In this embodiment of this application, the foldable screen mobile phone 200 has two structural members (that is, the first structural member 21 and the second structural member 22) by way of example for description.

Further, the foldable screen mobile phone 200 may further include a rear cover 25. As shown in FIG. 1 or FIG. 2, the rear cover 25 is located on one sides of the first structural member 21, the rotating shaft assembly 23, and the second structural member 22 facing away from the display 24. For example, the first structural member 21, the rotating shaft assembly 23, and the second structural member 22 are all located between the display 24 and the rear cover 25.

Figure 5:
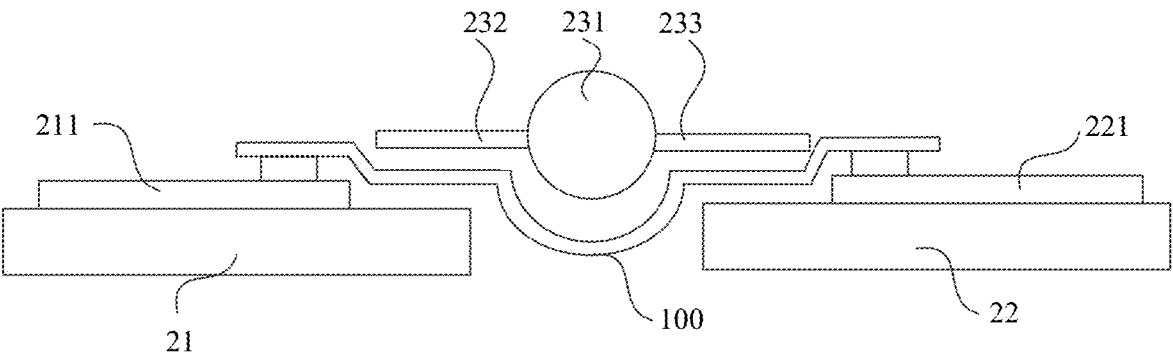
FIG. 5 is a three-dimensional schematic structural diagram of a foldable screen mobile phone according to an embodiment of this application in an unfolded state.
Figure 6:
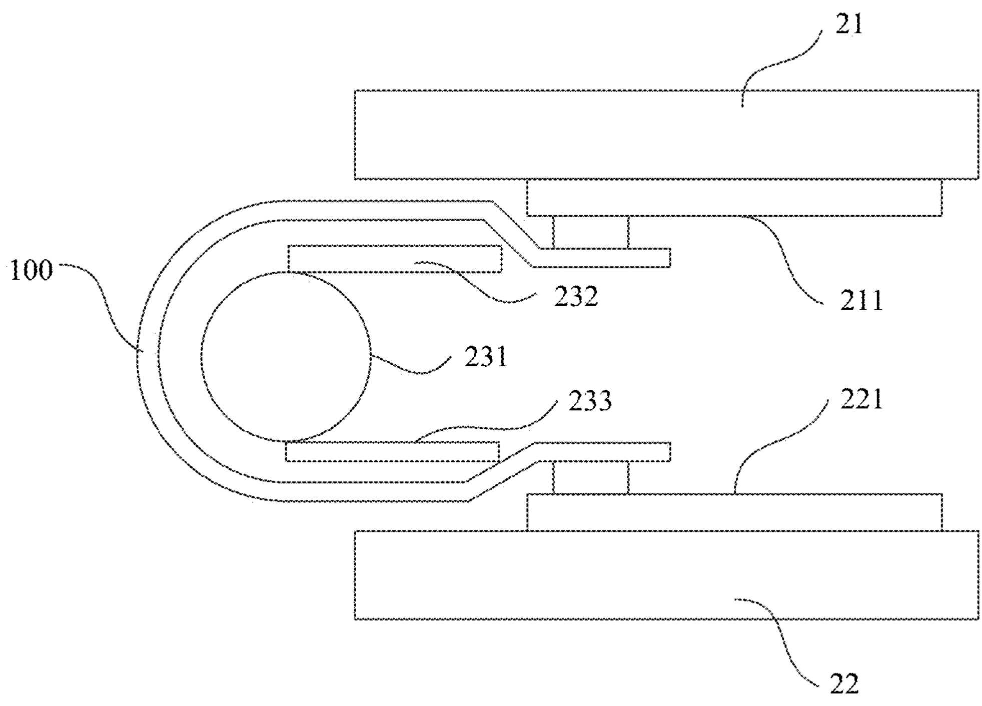
FIG. 6 is a three-dimensional schematic structural diagram of a foldable screen mobile phone according to an embodiment of this application in a folded state.

Referring to FIG. 4 to FIG. 6, the foldable screen mobile phone 200 may further include batteries (such as a first battery 212 and a second battery 222) and circuit boards (such as a first circuit board 211 and a second circuit board 221). Specifically, as shown in FIG. 5, the first structural member 21 has the first battery 212 and two first circuit boards 211 located on two sides of the first battery 212, and the second structural member 22 has the second battery 222 and two second circuit boards 221 located on two sides of the second battery 222.

It may be understood that the structures illustrated in this embodiment of this application do not constitute a specific limitation on the foldable screen mobile phone 200. In some other embodiments of this application, the foldable screen mobile phone 200 may include more or fewer components than those shown in the figure, or some components may be combined, or some components may be split, or components are arranged in different manners. The components shown in the figure may be implemented by hardware, software, or a combination of software and hardware.

In order to realize a communication function of the foldable screen mobile phone 200, an antenna (not shown) is usually arranged on the foldable screen mobile phone 200, so as to transmit and receive signals through the antenna. In this embodiment of this application, antennas may be formed on a metal frame of the foldable screen mobile phone 200 by forming two slits.

In the prior art, generally, an antenna can only be arranged on only one side of a structural member of a foldable screen mobile phone 200. For example, an antenna is arranged only on the first structural member 21 of the foldable screen mobile phone 200, or only on the second structural member 22 of the foldable screen mobile phone 200, which may lead to a very tense antenna environment in a multi-antenna application scenario.

In order to improve the antenna environment to realize arrangement of antennas on the structural members on two sides of the foldable screen mobile phone, as shown in FIG. 4 or FIG. 6, the foldable screen mobile phone 200 provided in this embodiment of this application may further include a transmission assembly 100. One end of the transmission assembly 100 is connected to the first circuit board 211 in the first structural member 21, and another end of the transmission assembly 100 extends through the rotating shaft assembly 23 and is connected to the second circuit board 221 in the second structural member 22. For example, in FIG. 4, a transmission assembly 100 is arranged in the foldable screen mobile phone 200. One end of the transmission assembly 100 is connected to one of the first circuit boards 211 in the first structural member 21, and another end of the transmission assembly 100 extends through the bending area 210 and is connected to the second circuit board 221 in the second structural member 22. Two circuit boards located at the same side (for example, two second circuit boards 221 in the second structural member 22) may be connected through a flexible circuit board 26.

However, bending resistance of a current common transmission assembly is relatively poor, resulting in poor reliability of the transmission assembly when the transmission assembly is used in the foldable screen mobile phone and a failure to satisfy performance requirements for the transmission assembly required in the foldable screen mobile phone.

Based on this, an embodiment of this application provides a transmission assembly. The transmission assembly is configured for use in the foldable electronic device (for example, a foldable screen mobile phone). In the transmission assembly, by arranging a first conductive fabric, the first conductive fabric has good tensile performance during bending of the first transmission assembly, which can improve bending resistance of the first transmission assembly, thereby enhancing reliability of the transmission assembly when the transmission assembly is used in a foldable screen device, and improving use effects of users while meeting performance requirements for transmission assemblies required in foldable screen devices.

A specific structure of the transmission assembly in this embodiment of this application is described in detail below by using different embodiments as examples with reference to the specific accompanying drawings.

Embodiment I

Figure 7:
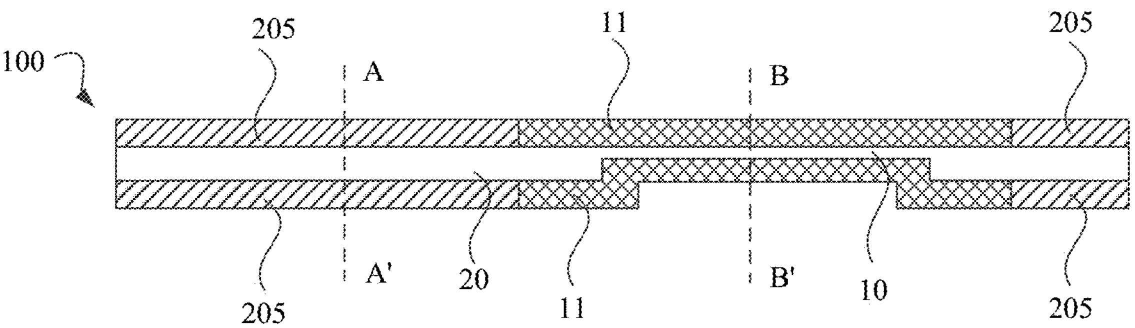
FIG. 7 is a schematic structural diagram of a transmission assembly according to an embodiment of this application.
Figure 8:
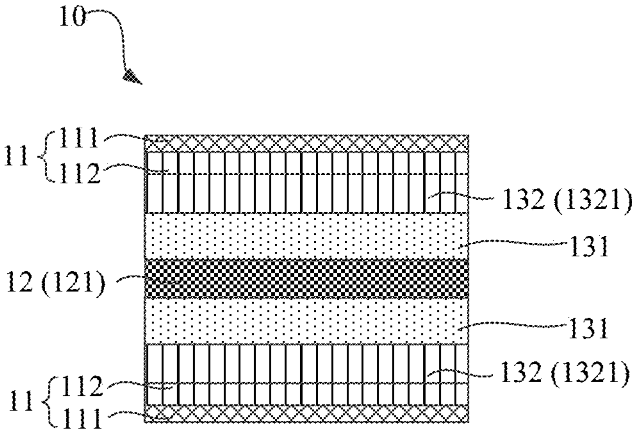
FIG. 8 is a sectional view of the transmission assembly shown in FIG. 7 taken along line B-B'.

Referring to FIG. 7 or FIG. 8, an embodiment of this application provides a transmission assembly 100. The transmission assembly 100 is configured for use in a foldable electronic device (for example, a foldable screen mobile phone 200). The transmission assembly 100 may include a first transmission assembly 10. The first transmission assembly 10 is configured for use in a bending area 210 of the foldable electronic device (refer to FIG. 4). As shown in FIG. 8, the first transmission assembly 10 may include at least two first conductive layers 11 and a first transmission layer 12 located between the two first conductive layers 11. Each of the first conductive layers 11 may include at least a first conductive fabric 111. The first transmission layer 12 may include at least one first signal line 121. A dielectric layer 13 is further arranged between the first conductive layer 11 and the first transmission layer 12. The dielectric layer 13 may include at least a first substrate layer 131.

Figure 11:
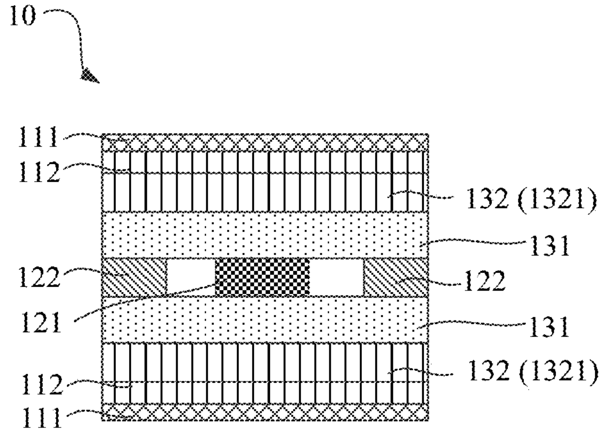
FIG. 11 is another schematic sectional view of a first transmission assembly in a transmission assembly according to an embodiment of this application.
Figure 12:
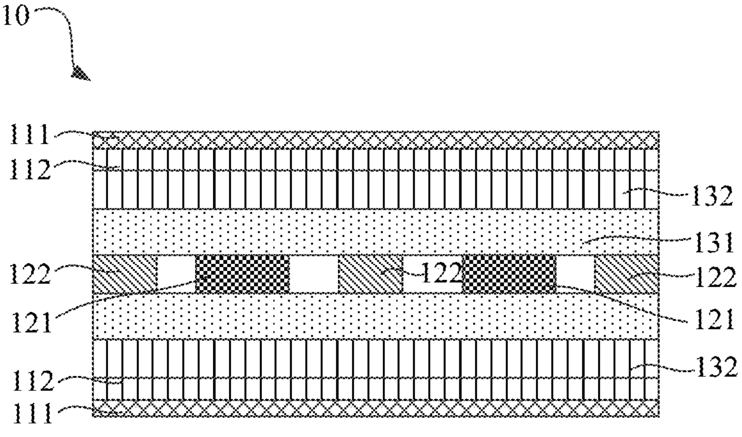
FIG. 12 is another schematic sectional view of a first transmission assembly in a transmission assembly according to an embodiment of this application.

In this embodiment of this application, referring to FIG. 11 and FIG. 12, the first transmission layer 12 may further include at least one first ground wire 122. At least one first ground wire 122 is arranged on each of two sides of each of the first signal lines 121. Specifically, in FIG. 11, the first transmission layer 12 includes a first signal line 121 and two first ground wires 122, and the first ground wires 122 located on two sides of the first signal line 121 can play a role in shielding external interference signals. In FIG. 12, the first transmission layer 12 includes two first signal lines 121 and three first ground wires 122. The first ground wire 122 located between two adjacent first signal lines 121 (that is, the first ground wire 122 located in the middle of the first transmission layer 12) can play a role of isolation to avoid mutual interference between two adjacent first signal lines 121. The two first ground wires 122 located at two outermost sides of the first transmission layer 12 can play a role in shielding external interference signals.

Alternatively, in some other embodiments, the first transmission layer 12 may include two first signal lines 121 and a first ground wire 122. The first ground wire 122 is located between the two first signal lines 121, and the first ground wire 122 can play a role of isolation to avoid mutual interference between the two first signal lines 121.

In addition, it may be understood that in a possible implementation, the first ground wire 122 may not be arranged between two adjacent first signal lines 121, so that a distance between two adjacent first signal lines 121 is increased, and it can be ensured that an isolation degree between two adjacent first signal lines 121 is greater than 20 dB.

It should be noted that, a distance between the first signal line 121 and the first ground wire 122 may be greater than a distance between the first signal line 121 and the first conductive layer 11. In this way, it can be ensured that the first signal line 121 is still a control impedance of a stripline structure, and the first ground wires 122 on left and right sides only play the role of shielding interference, without affecting the impedance of the first signal line 121. If the distance between the first signal line 121 and the first ground wire 122 is excessively small, a coplanar waveguide may be changed.

In this embodiment of this application, a material of the first substrate layer 131 may be a low-loss and low-dielectric material such as liquid crystal polymer (Liquid Crystal Polymer, LCP), fluorine, polyimide (Polyimide, PI), or modified polyimide (MPI), which is neither limited in this embodiment of this application nor limited to the above examples.

In this embodiment of this application, referring to FIG. 8, the first conductive layer 11 may further include a first conductive adhesive layer 112. The first conductive adhesive layer 112 is located between the first conductive fabric 111 and the dielectric layer 13, and the first conductive adhesive layer 112 is configured to bond the first conductive fabric 111 to the dielectric layer 13.

In an optional implementation, the first conductive fabric 111 and the first conductive adhesive layer 112 may be integrally formed. The integral formation of the first conductive fabric 111 and the first conductive adhesive layer 112 can ensure the reliability of the first conductive layer 11.

In some embodiments, the first conductive fabric 111 may include a first base layer and a conductive material arranged on the first base layer. The tensile strength of the first base layer is greater than 360 Mpa, that is, the tensile strength of the first base layer is greater than tensile performance of copper. In this way, the first base layer with the tensile strength greater than 360 Mpa can ensure the tensile performance of the first conductive fabric 111, and the conductive material arranged on the first base layer can ensure the conductivity of the first conductive fabric 111.

For example, the first base layer may be made of a polyester fiber. The polyester fiber is a synthetic fiber obtained by spinning polyester obtained by polycondensation of organic dibasic acid and dibasic alcohol, which has excellent wrinkle resistance and shape retention, and high strength and elastic restorability, and is durable.

Figure 13:
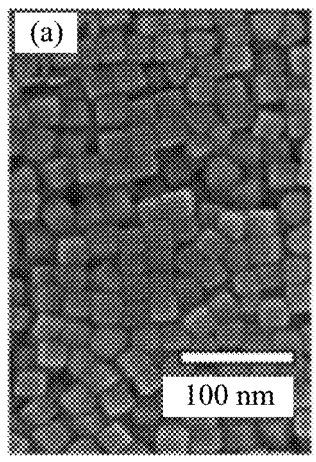
FIG. 13 is an electron microscope scanning diagram of a conductive fabric of a first transmission assembly in a transmission assembly according to an embodiment of this application.
Figure 14:
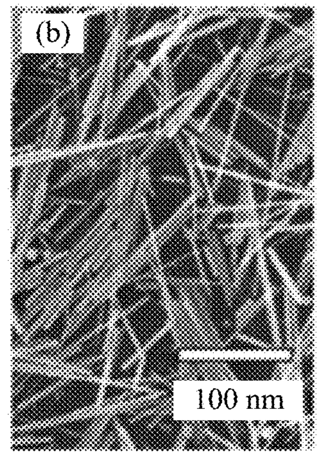
FIG. 14 is an electron microscope scanning diagram of a conductive fabric of a first transmission assembly in a transmission assembly according to an embodiment of this application.

In this embodiment of this application, the conductive material may be any one or more of copper, gold, and nickel. The conductive material may be granular (as shown in FIG. 13 and FIG. 14) or branched (as shown in FIG. 13 and FIG. 14).

In a practical application scenario, the polyester fiber may be plated with nickel, then plated with copper with high conductivity and nickel with anti-oxidation and anti-corrosion, and finally plated with gold. The first conductive fabric 111 formed in this way provides good conductivity and electromagnetic shielding effects due to the combination of copper, nickel, and gold. In addition, according to the requirements of shielding design, a linear size of the gap in the conductive fabric is less than 1/10 wavelength, and a size of a cavity is less than 1/5 wavelength. A mesh number of the conventional conductive fabric is generally in a range of 100 mesh to 400 mesh, and an aperture size is in a range of 0.150 mm to 0.0374 mm. In this way, a better shielding effect can be obtained in the range of 100 K-3 GHz.

In addition, for the interference above 3 GHz, a metal/conductive polymer composite layer may be constructed on a surface of the first conductive fabric 111 or inside the first conductive adhesive layer 112, for example, dendritic crystals are used inside the colloid of the first conductive adhesive layer 112 to replace conductive particles, or metal wires and particles with a wave-absorbing function are woven in the first conductive fabric 111. The first conductive layer 11 obtained in this way (that is, an anti-electromagnetic radiation woven fabric material) can realize two attenuation mechanisms of reflection and absorption, so as to achieve an effect of mutual enhancement and solve the problem of high-frequency shielding.

In this embodiment of this application, a thickness of the first conductive layer 11 may be in a range of 0.01 mm to 0.1 mm. In an optional implementation, a thickness of the first conductive layer 11 may be in a range of 0.03 mm to 0.05 mm. For example, the thickness of the first conductive layer 11 may be 0.035 mm, 0.04 mm, or 0.045 mm. It should be noted herein that the numerical value and the numerical range involved in this application are approximate values, and an error within a certain range may exist due to impact of the manufacturing process. The error may be considered negligible by a person skilled in the art.

In an optional implementation, in an area of 4*4 (or 2*2) $mm^2$, a lapping impedance of the first conductive layer 11 does not exceed 200 milliohms, and the reliability does not exceed 200 milliohms after degradation. In a range of 500 MHz to 6 GHz, the shielding effectiveness of the first conductive layer 11 is greater than 70 dBm.

Referring to FIG. 8, the dielectric layer 13 may further include an insulating layer 132. The insulating layer 132 is located between the first conductive layer 11 and the first substrate layer 131. The specific arrangement of the insulating layer 132 includes but is not limited to the following possible implementations.

A possible implementation is as follows. As shown in FIG. 8, the insulating layer 132 includes a first insulating adhesive layer 1321. The first insulating adhesive layer 1321 is located between the first conductive layer 11 and the first substrate layer 131. By arranging the first insulating adhesive layer 1321 between the first conductive layer 11 and the first substrate layer 131, a thickness of the first substrate layer 131 can be appropriately reduced, and the first insulating adhesive layer 1321 has better tensile performance compared with the first substrate layer 131, thereby enhancing bending resistance of the first transmission assembly 10.

Figure 9:
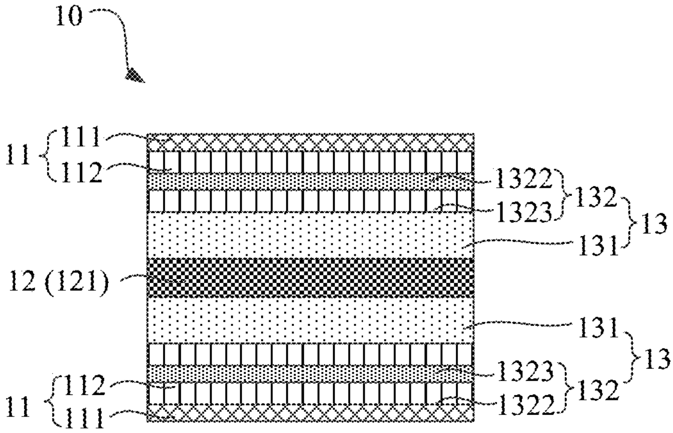
FIG. 9 is a sectional view of the transmission assembly shown in FIG. 7 taken along line B-B'.

Another possible implementation is as follows. As shown in FIG. 9, the insulating layer 132 includes an insulating fabric 1322 and a second insulating adhesive layer 1323. The second insulating adhesive layer 1323 is located between the insulating fabric 1322 and the first substrate layer 131. The insulating fabric 1322 has good tensile performance, which can further optimize the bending resistance of the first transmission assembly 10.

In an optional implementation, the insulating fabric 1322 may be made of a polyester fiber.

Figure 10:
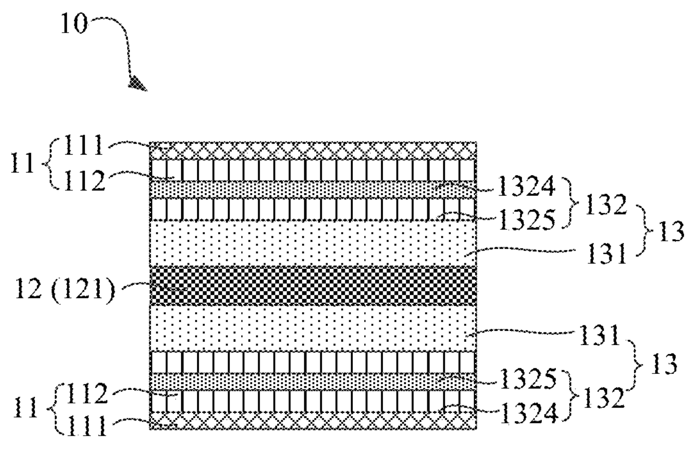
FIG. 10 is a sectional view of the transmission assembly shown in FIG. 7 taken along line B-B'.

Still another possible implementation is as follows. As shown in FIG. 10, the insulating layer 132 may include a foamed layer 1324 and a third insulating adhesive layer 1325. The third insulating adhesive layer 1325 is located between the foamed layer and the first substrate layer 131.

It should be noted that, the foamed layer 1324 may be a closed-cell foam, a semi-closed-cell foam, or a foamed material. The closed-cell foam, the semi-closed-cell foam, or the foamed material has excellent resilience and retention. For example, the foamed material may be a composite material formed of polytetrafluoroethylene (Polytetrafluoroethylene, PTFE), polyurethane (PU), or a copolymer of polytetrafluoroethylene and fluorinated ethylene propylene (Fluorinated ethylene propylene, FEP). Polytetrafluoroethylene has excellent chemical stability, corrosion resistance, sealing performance, high lubrication and non-stickiness, electrical insulation, and good aging resistance. Polyurethane is a thermoplastic linear structure with good stability, chemical resistance, resilience and mechanical properties, and has less compression deformation. The copolymer of polytetrafluoroethylene and fluorinated ethylene propylene has good processability of thermoplastics.

The thickness of the insulating layer 132 may be in a range of 0.04 mm to 0.1 mm. For example, the thickness of the insulating layer 132 may be 0.05 mm, 0.06 mm, or 0.07 mm. It should be noted herein that the numerical value and the numerical range involved in this application are approximate values, and an error within a certain range may exist due to impact of the manufacturing process. The error may be considered negligible by a person skilled in the art.

In this embodiment of this application, the thickness of the first substrate layer 131 may be in a range of 0.012 mm to 0.025 mm. For example, the thickness of the first substrate layer 131 may be 0.015 mm, 0.018 mm, or 0.021 mm. It should be noted herein that the numerical value and the numerical range involved in this application are approximate values, and an error within a certain range may exist due to impact of the manufacturing process. The error may be considered negligible by a person skilled in the art.

Figure 15:
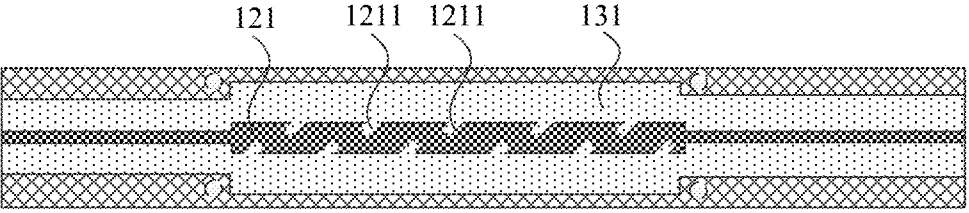
FIG. 15 is a cross-sectional view of a transmission assembly according to an embodiment of this application.
Figure 16:
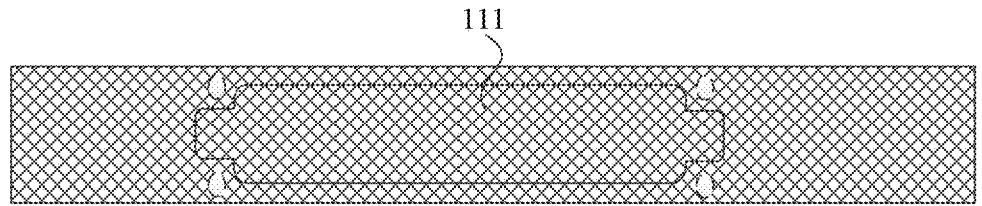
FIG. 16 is a top view or a bottom view of a transmission assembly according to an embodiment of this application.

In addition, in a possible implementation, as shown in FIG. 15 and FIG. 16, a plurality of notches 1211 may be arranged on the first signal line 121, and the plurality of notches 1211 are arranged at intervals in a bending direction perpendicular to the first transmission assembly 10.

Figure 17:
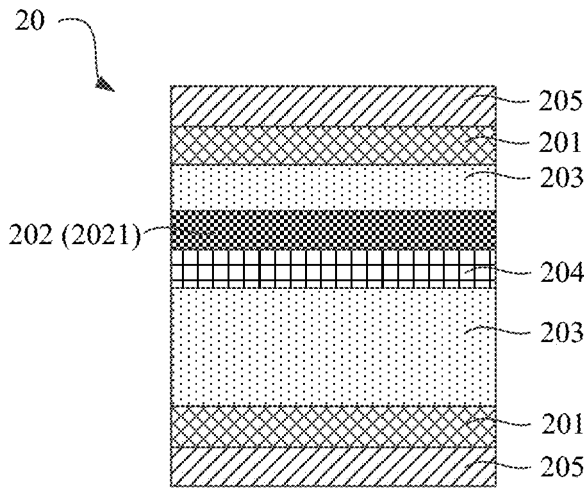
FIG. 17 is a sectional view of the transmission assembly shown in FIG. 7 taken along line A-A'.
Figure 18:
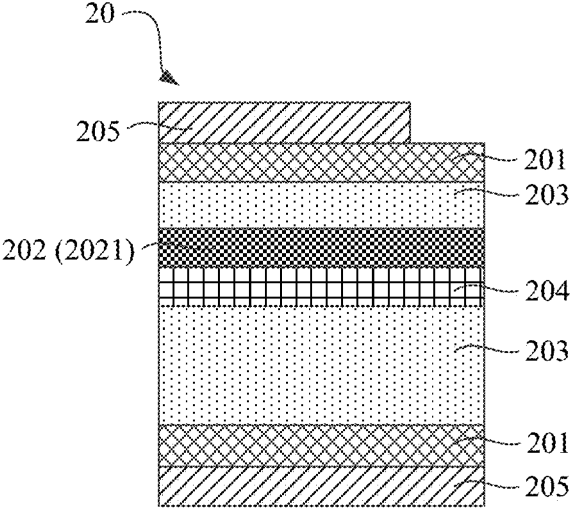
FIG. 18 is a sectional view of the transmission assembly shown in FIG. 7 taken along line A-A'.

Referring to FIG. 17 and FIG. 18, the transmission assembly 100 may further include a second transmission assembly 20. The second transmission assembly 20 is connected to the first transmission assembly 10, and the second transmission assembly 20 is configured for use in a non-bending area of the foldable electronic device (that is, an area outside the bending area 210 of the foldable screen phone 200 in FIG. 4). It should be noted that, at least part of the first transmission assembly 10 covers the rotating shaft assembly 23. Since the first transmission assembly 10 has bending resistance, when the first transmission assembly is configured for use in a corresponding area of the rotating shaft assembly 23 that needs to be bent, the use reliability of the transmission assembly 100 can be ensured.

Specifically, the second transmission assembly 20 may include at least two first ground layers 201 and a second transmission layer 202 located between the two first ground layers 201. The second transmission layer 202 may include a second signal line 2021. A second substrate layer 203 is further arranged between the first ground layer 201 and the second transmission layer 202. The first ground layer 201 is connected to the first conductive layer 11, the second transmission layer 202 is connected to the first transmission layer 12, and the second substrate layer 203 is connected to the first substrate layer 131.

When the second transmission assembly 20 in the transmission assembly 100 is configured for use in the non-bending area in the foldable electronic device, structural strength and stability of the transmission assembly 100 corresponding to the non-bending area can be ensured. When the first transmission assembly 10 in the transmission assembly 100 is configured for use in the bending area of the foldable electronic device, the conductive fabric is arranged in the first transmission assembly 10 as the ground layer, which can ensure the bending resistance and reliability of the transmission assembly 100 corresponding to the bending area 210.

In a possible implementation, the second transmission layer 202 and the first transmission layer 12 may be integrally arranged, and the second substrate layer 203 and the first substrate layer 131 may be integrally arranged. In this way, reliability of signal transmission between the first transmission assembly 10 and the second transmission assembly 20 can be ensured.

In addition, in an optional implementation, the second transmission assembly 20 may further include a first bonding layer 204 (refer to FIG. 17). The first bonding layer 204 is located between the second transmission layer 202 and the second substrate layer 203, and the first bonding layer 204 may be a low-loss adhesive or the like. This is not limited in this embodiment of this application.

Still referring to FIG. 17, the second transmission assembly 20 may further include a first cover layer 205. The first cover layer 205 is located on a side of the first ground layer 201 away from the second substrate layer 203. The first cover layer 205 may be a cover film made of ink, or the like. This is not limited in this embodiment of this application.

It is easy to understand that the first conductive layer 11 may be connected to the side of the first ground layer 201 facing away from the second substrate layer 203. The first conductive layer 11 of the first transmission assembly 10 is connected to the first ground layer 201 of the second transmission assembly 20, which can ensure the performance of signal transmission between the first transmission assembly 10 and the second transmission assembly 20. Specifically, referring to FIG. 18, a part of the first cover layer 205 attached to the first ground layer 201 in the second transmission assembly 20 may be removed (for example, by using a process such as etching), and an end of the first conductive layer 11 may be arranged at the position, so as to realize the electrical connection between the first conductive layer 11 and the first ground layer 201.

In a possible implementation, a connection area between the first conductive layer 11 and the first ground layer 201 is greater than or equal to 20 $mm^2$. For example, the connection area between the first conductive layer 11 and the first ground layer 201 may be 20 $mm^2$, 25 $mm^2$, or 30 $mm^2$. Increasing the connection area between the first conductive layer 11 and the first ground layer 201 can further ensure the reliability of the signal transmission between the first transmission assembly 10 and the second transmission assembly 20, and can avoid the problem of stray radiation.

Figure 19:
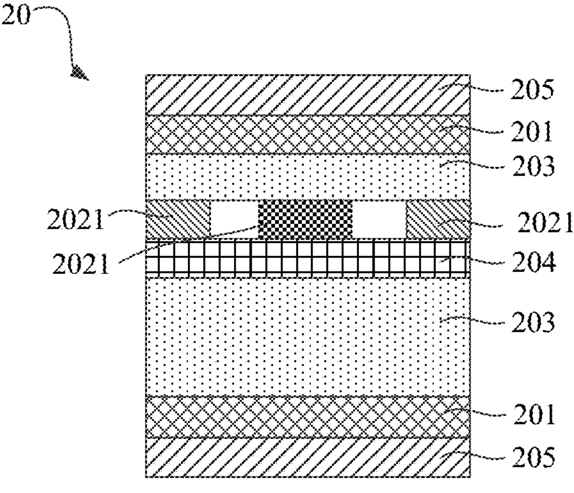
FIG. 19 is another schematic sectional view of a second transmission assembly in a transmission assembly according to an embodiment of this application.

In this embodiment of this application, referring to FIG. 19, the second transmission layer 202 may further include at least one fourth ground wire 2022. The at least one fourth ground wire 2022 is arranged on each of two sides of each of the second signal lines 2021. Specifically, in FIG. 19, the first transmission layer 12 includes a second signal line 2021 and two fourth ground wires 2022, and the fourth ground wires 2022 located on two sides of the second signal line 2021 can play a role in shielding external interference signals.

Alternatively, the second transmission layer 202 may include two second signal lines 2021 and three fourth ground wires 2022. The fourth ground wire 2022 located between two adjacent second signal lines 2021 (that is, the fourth ground wire 2022 located in the middle of the second transmission layer 202) can play a role of isolation to avoid mutual interference between two adjacent second signal lines 2021. The two fourth ground wires 2022 located at two outermost sides of the second transmission layer 202 can play a role in shielding external interference signals.

Alternatively, in some other embodiments, the second transmission layer 202 may include two second signal lines 2021 and a fourth ground wire 2022. The fourth ground wire 2022 is located between the two second signal lines 2021, and the fourth ground wire 2022 can play a role of isolation to avoid mutual interference between the two second signal lines 2021.

In addition, it may be understood that in a possible implementation, the fourth ground wire 2022 may not be arranged between two adjacent second signal lines 2021, so that a distance between two adjacent second signal lines 2021 is increased, and it can be ensured that an isolation degree between two adjacent second signal lines 2021 is greater than 20 dB.

It should be noted that, a distance between the second signal line 2021 and the fourth ground wire 2022 may be greater than a distance between the second signal line 2021 and the first conductive layer 11. In this way, it can be ensured that the second signal line 2021 is still a control impedance of a stripline structure, and the fourth ground wires 2022 on left and right sides only play the role of shielding interference, without affecting the impedance of the second signal line 2021. If the distance between the second signal line 2021 and the fourth ground wire 2022 is excessively small, a coplanar waveguide may be changed.

Figure 20:
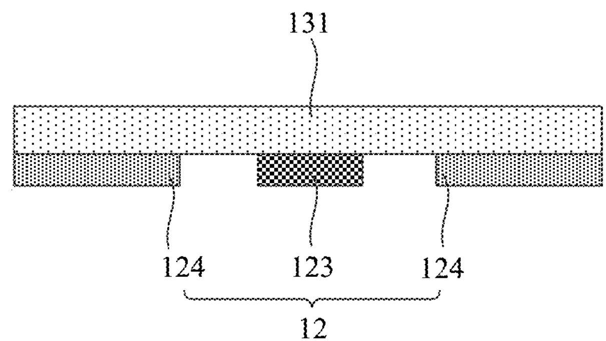
FIG. 20 is a schematic sectional view of a first transmission assembly in the prior art.
Figure 21:
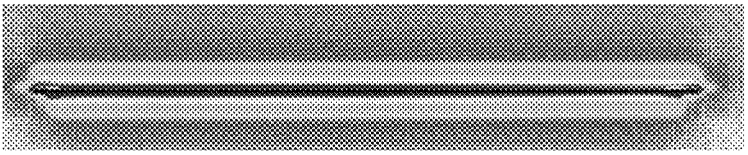
FIG. 21 is an antenna radiation effect diagram when the first transmission assembly shown in FIG. 20 is configured for use in a foldable screen mobile phone.
Figure 22:
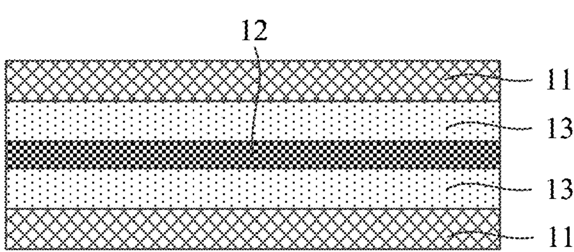
FIG. 22 is a schematic sectional view of the first transmission assembly according to an embodiment of this application.
Figure 23:
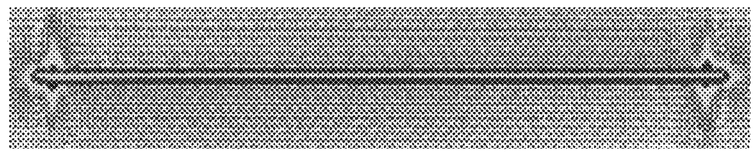
FIG. 23 is an antenna radiation effect diagram when the first transmission assembly shown in FIG. 22 is configured for use in a foldable screen mobile phone.

It should be noted that, as shown in FIG. 20, the first transmission assembly 10 may only include the first transmission layer 12 (the first transmission layer 12 includes the signal line 123 on a same layer and the ground wire 124 on a same layer spaced apart from each other) and the first substrate layer 131, so that the radiation performance diagram of the antenna in the foldable screen mobile phone 200 with the first transmission assembly 10 is shown in FIG. 21. As shown in FIG. 22, the first transmission assembly 10 includes the first transmission layer 12 and dielectric layers 13 located on two sides of the first transmission layer 12. A first conductive layer 11 is further arranged on a side of the two dielectric layers 13 facing away from the first transmission layer 12, so that the radiation performance diagram of the antenna in the foldable screen mobile phone 200 with the first transmission assembly 10 is shown in FIG. 23. By comparing FIG. 21 with FIG. 23, it may be learned that the interference protection effect of the first transmission assembly 10 in FIG. 22 is obviously better than the interference protection effect of the first transmission assembly 10 in FIG. 20.

In addition, in this embodiment of this application, the manner of adjusting the impedance of the first transmission assembly 10 includes, but is not limited to, the following three possible implementations.

A possible implementation is as follows. A thickness of the dielectric layer 13 may be set such that a first distributed capacitance is formed between the first conductive layer 11 and the first signal layer, and the first distributed capacitance causes an impedance of the first transmission assembly 10 to match an impedance of the second transmission assembly 20.

It may be understood that a distributed capacitance is formed between the first conductive layer 11 and the first signal layer. Increasing the thickness of the dielectric layer 13 can increase the distributed capacitance, and the impedance of the first transmission assembly 10 is related to the distributed capacitance. Increasing the distributed capacitance can reduce the impedance of the first transmission assembly 10. In this way, when the thickness of the dielectric layer 13 reaches a preset value, the first distributed capacitance is formed between the first conductive layer 11 and the first signal layer, and the first distributed capacitance can cause the impedance of the first transmission assembly 10 to match the impedance of the second transmission assembly 20.

For example, when the impedance of the second transmission assembly 20 is 50Ω (ohms), the thickness of each dielectric layer 13 is set to 0.107 mm, a thickness of the first signal layer is 12 μm, and a dielectric constant c of the dielectric layer 13 is 2.9, and when a transmission frequency is 2000 MHz, the first distributed capacitance is formed between the first conductive layer 11 and the first signal layer, and the first distributed capacitance can cause the impedance of the first transmission assembly 10 to be 50Ω.

Another possible implementation is as follows. A weaving density of the first conductive fabric 111 of the first conductive layer 11 is set such that a second distributed capacitance is formed between the first conductive layer 11 and the first signal layer, and the second distributed capacitance causes an impedance of the first transmission assembly 10 to match an impedance of the second transmission assembly 20.

A distributed capacitance is formed between the first conductive layer 11 and the first signal layer. Increasing the weaving density of the first conductive fabric 111 of the first conductive layer 11 can increase the distributed capacitance, and the impedance of the first transmission assembly 10 is related to the distributed capacitance. Increasing the distributed capacitance can reduce the impedance of the first transmission assembly 10. In this way, when the weaving density of the first conductive fabric 111 of the first conductive layer 11 reaches a preset value, the second distributed capacitance is formed between the first conductive layer 11 and the first signal layer, and the second distributed capacitance can cause the impedance of the first transmission assembly 10 to match the impedance of the second transmission assembly 20.

Still another possible implementation is as follows. The dielectric constant of the dielectric layer 13 is set such that a third distributed capacitance is formed between the first conductive layer 11 and the first signal layer, and the third distributed capacitance causes an impedance of the first transmission assembly 10 to match an impedance of the second transmission assembly 20.

A distributed capacitance is formed between the first conductive layer 11 and the first signal layer. Decreasing the dielectric constant of the dielectric layer 13 can increase the distributed capacitance, and the impedance of the first transmission assembly 10 is related to the distributed capacitance. Increasing the distributed capacitance can reduce the impedance of the first transmission assembly 10. In this way, when the dielectric constant of the dielectric layer 13 reaches a preset value, the third distributed capacitance is formed between the first conductive layer 11 and the first signal layer, and the third distributed capacitance can cause the impedance of the first transmission assembly 10 to match the impedance of the second transmission assembly 20.

For example, when the impedance of the second transmission assembly 20 is 50Ω, the dielectric constant of the dielectric layer 13 is set to 2, a thickness of each dielectric layer 13 is set to 0.039 mm, and a thickness of the first signal layer is 12 μm, and when a transmission frequency is 2000 MHz, the third distributed capacitance is formed between the first ground layer 201 and the first signal layer, and the third distributed capacitance causes the impedance of the first transmission assembly 10 to be 50Ω.

It should be noted that, if the impedance of the first transmission assembly 10 does not match the impedance of the second transmission assembly 20, transmission performance of the transmission assembly 100 may be poor. Therefore, in this embodiment of this application, the impedance of the first transmission assembly 10 is caused to match the impedance of the second transmission assembly 20, so that the signal transmission performance of the transmission assembly 100 can be ensured.

Embodiment II

Figure 24:
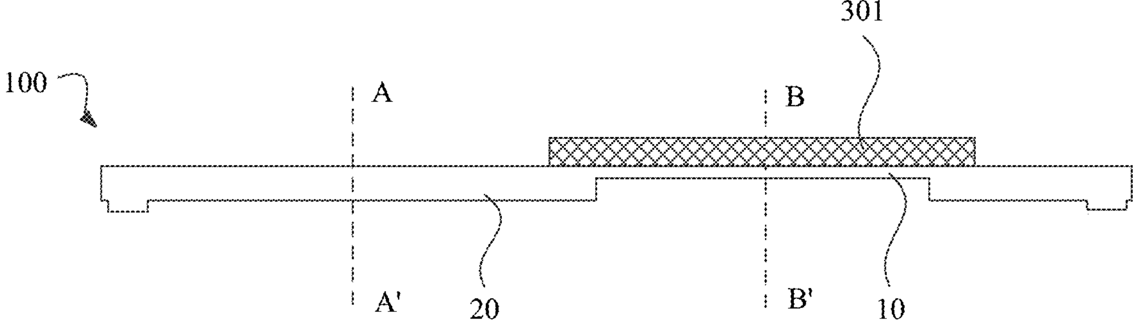
FIG. 24 is a schematic structural diagram of a transmission assembly according to an embodiment of this application.
Figure 25:
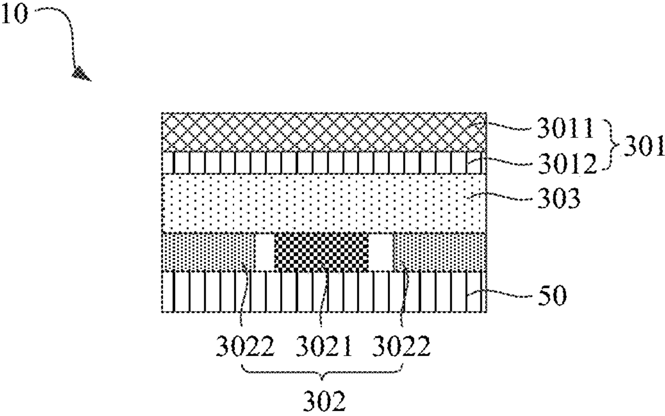
FIG. 25 is a schematic sectional view of a first transmission assembly in a transmission assembly according to an embodiment of this application.

Referring to FIG. 24, an embodiment of this application further provides a transmission assembly 100. The transmission assembly 100 is configured for use in a foldable electronic device (for example, a foldable screen mobile phone 200). Specifically, as shown in FIG. 25, the transmission assembly 100 includes a first transmission assembly 10. The first transmission assembly 10 is configured for use in a bending area 210 of the foldable electronic device. The first transmission assembly 10 includes at least a second conductive layer 301, a third transmission layer 302, and a third substrate layer 303 located between the second conductive layer 301 and the third transmission layer 302. The third transmission layer 302 includes a third signal line 3021 and a second ground wire 3022 located on two sides of the third signal line 3021, and the second ground wire 3022 extends through the third substrate layer 303 and is connected to the second conductive layer 301. The second conductive layer 301 includes a second conductive fabric 3011.

Still referring to FIG. 25, the second conductive layer 301 may further include a second conductive adhesive layer 3012. The second conductive adhesive layer 3012 is located between the second conductive fabric 3011 and the third substrate layer 303, and the second conductive adhesive layer 3012 is configured to bond the second conductive fabric 3011 to the third substrate layer 303.

In an optional implementation, the second conductive fabric 3011 and the second conductive adhesive layer 3012 may be integrally formed. The integral formation of the second conductive fabric 3011 and the second conductive adhesive layer 3012 can ensure the reliability of the second conductive layer 301.

In some embodiments, the second conductive fabric 3011 may include a second base layer and a conductive material arranged on the second base layer. The tensile strength of the second base layer is greater than 700 Mpa. In this way, the second base layer with the tensile strength greater than 700 Mpa can ensure the tensile performance of the second conductive fabric 3011, and the conductive material arranged on the second base layer can ensure the conductivity of the second conductive fabric 3011.

For example, the second base layer may be made of a polyester fiber. The polyester fiber is a synthetic fiber obtained by spinning polyester obtained by polycondensation of organic dibasic acid and dibasic alcohol, which has excellent wrinkle resistance and shape retention, and high strength and elastic restorability, and is durable.

In this embodiment of this application, a thickness of the second conductive layer 301 may be in a range of 0.03 mm to 0.05 mm. For example, the thickness of the second conductive layer 301 may be 0.035 mm, 0.04 mm, or 0.045 mm. It should be noted herein that the numerical value and the numerical range involved in this application are approximate values, and an error within a certain range may exist due to impact of the manufacturing process. The error may be considered negligible by a person skilled in the art.

By arranging the second conductive layer 301 as the second conductive fabric, the second conductive fabric has good tensile performance during bending of the first transmission assembly 10, which can improve bending resistance of the first transmission assembly 10, thereby enhancing reliability of the transmission assembly 100 when the transmission assembly is used in a foldable screen device, and meeting performance requirements for transmission assemblies 100 required in foldable screen devices.

Figure 26:
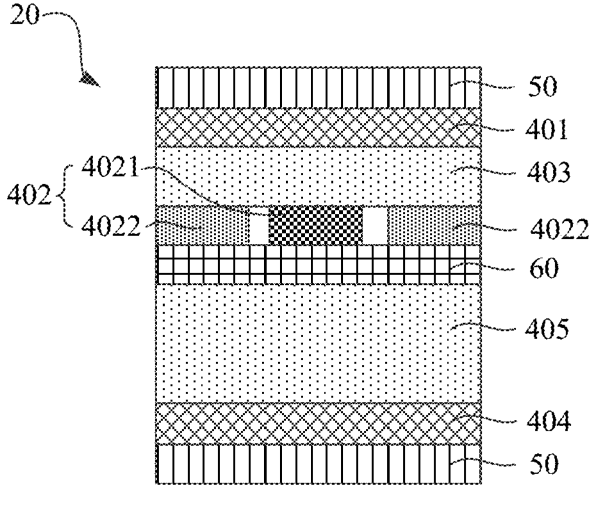
FIG. 26 is a schematic sectional view of a second transmission assembly in a transmission assembly according to an embodiment of this application.
Figure 27:
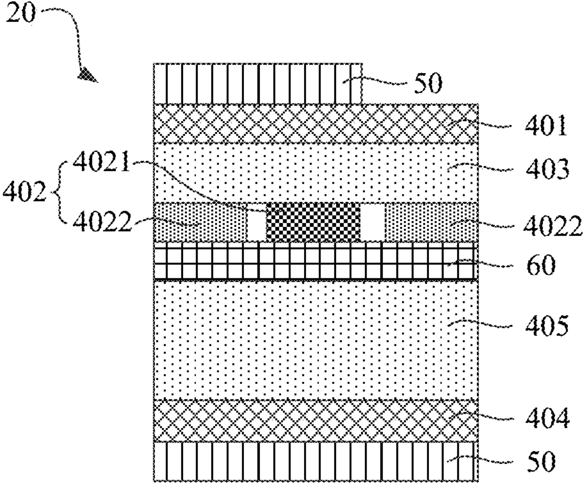
FIG. 27 is a schematic sectional view of a second transmission assembly in a transmission assembly according to an embodiment of this application.

In a possible implementation, the transmission assembly 100 further includes a second transmission assembly 20. The second transmission assembly 20 is connected to the first transmission assembly 10, and the second transmission assembly 20 is configured for use in a non-bending area of the foldable electronic device. Referring to FIG. 26 or FIG. 27, the second transmission assembly 20 includes at least a second ground layer 401, a fourth transmission layer 402, and a fourth substrate layer 403 located between the second ground layer 401 and the fourth transmission layer 402. The second ground layer 401 is connected to the second conductive layer 301, the fourth transmission layer 402 is connected to the third transmission layer 302, and the fourth substrate layer 403 is connected to the third substrate layer 303.

When the second transmission assembly 20 in the transmission assembly 100 is configured for use in the non-bending area in the foldable electronic device, structural strength and stability of the transmission assembly 100 corresponding to the non-bending area can be ensured. When the first transmission assembly 10 in the transmission assembly 100 is configured for use in the bending area 210 of the foldable electronic device, the second conductive layer 301 in the first transmission assembly 10 is a conductive fabric, which can ensure the bending resistance and reliability of the transmission assembly 100 corresponding to the bending area.

In a possible implementation, the fourth transmission layer 402 and the third transmission layer 302 are integrally arranged, and the fourth substrate layer 403 and the third substrate layer 303 are integrally arranged. In this way, reliability of signal transmission between the first transmission assembly 10 and the second transmission assembly 20 can be ensured.

In a possible implementation, the second transmission assembly 20 further includes a third ground layer 404 and a fifth substrate layer 405. The fourth transmission layer 402 is located between the fourth substrate layer 403 and the fifth substrate layer 405, and the fifth substrate layer 405 is located between the fourth transmission layer 402 and the third ground layer 404. In this way, the structural strength and the stability of the second transmission assembly 20 corresponding to the non-bending area can be further improved.

In addition, in an optional implementation, the second transmission assembly 20 may further include a second cover layer 50 (refer to FIG. 26 or FIG. 27). The second cover layer 50 is located on a side of the second ground layer 401 away from the fourth substrate layer 403 and a side of the third ground layer 404 away from the fifth substrate layer 405. The second cover layer 50 may be a cover film made of ink, or the like. This is not limited in this embodiment of this application.

The second transmission assembly 20 may further include a second bonding layer 60 (refer to FIG. 26 or FIG. 27). The second bonding layer 60 is located between the fourth transmission layer 402 and the fifth substrate layer 405, and the second bonding layer 60 may be a low-loss adhesive or the like. This is not limited in this embodiment of this application.

It is easy to understand that the fourth transmission layer 402 includes fourth signal lines 4021 arranged at intervals and third ground wires 4022 located on two sides of each of the fourth signal lines 4021.

In the descriptions of the embodiments of this application, it should be noted that, unless otherwise explicitly specified and defined, the terms “mount”, “connected”, and “connection” should be understood in a broad sense. For example, the connection may be a fixed connection, an indirect connection through an intermediary, internal communication inside two elements, or an interaction relationship between two elements. A person of ordinary skill in the art can understand specific meanings of the foregoing terms in the embodiments of this application according to a specific situation.

The apparatus or element indicated or implied in the embodiments of this application is required to have a specific orientation, be constructed and operate in the specific orientation, and therefore should not be construed as a limitation on the embodiments of this application. In the description of the embodiments of this application, unless otherwise specifically limited, “a plurality of” means two or more.

The terms such as “first”, “second”, “third”, and “fourth” (if any) in the specification and claims of the embodiments of this application and in the accompanying drawings are used for distinguishing between similar objects and not necessarily used for describing any particular order or sequence. It is to be understood that data used in this way is exchangeable in a proper case, so that the embodiments of this application described herein can be implemented in an order different from the order shown or described herein. Moreover, the terms “may include”, “have”, and any of their variants are intended to cover non-exclusive inclusions. For example, a process, a method, a system, a product, or a device that includes a list of steps or units is not necessarily limited to those expressly listed steps or units, but may include other steps or units not expressly listed or inherent to such a process, method, product, or device.

Finally, it should be noted that: the foregoing embodiments are merely intended for describing other than limiting the technical solutions of the embodiments of this application. Although the embodiments of this application are described in detail with reference to the foregoing embodiments, a person of ordinary skill in the art should understand that modifications may be made to the technical solutions described in the foregoing embodiments, or equivalent replacements may be made to some or all technical features in the technical solutions, as long as such modifications or replacements do not cause the essence of corresponding technical solutions to depart from the scope of the technical solutions of the embodiments of this application.

What is claimed is:

1. A foldable electronic device, comprising:

a first structural member and a second structural member, wherein a bending area is formed between the first structural member and the second structural member;

the first structural member comprises at least a first circuit board, and the second structural member comprises at least a second circuit board; and a transmission assembly, wherein one end of the transmission assembly is connected to the first circuit board, and another end of the transmission assembly is connected to the second circuit board;

wherein the transmission assembly comprises a first transmission assembly, the first transmission assembly is configured for use in a bending area of the foldable electronic device, and the first transmission assembly comprises at least:

two first conductive layers and a first transmission layer located between the two first conductive layers;

each of the first conductive layers comprises at least a first conductive fabric; and the first transmission layer comprises at least one first signal line; and a dielectric layer is arranged between the first conductive layer and the first transmission layer, and the dielectric layer comprises at least a first substrate layer, wherein the transmission assembly further comprises a second transmission assembly, wherein the second transmission assembly is connected to the first transmission assembly, and is configured for use in a non-bending area of the foldable electronic device;

the second transmission assembly comprises at least two first ground layers and a second transmission layer located between the two first ground layers, and the second transmission layer comprises a second signal line; and a second substrate layer is further arranged between each of the first ground layers and the second transmission layer, wherein the first ground layer is connected to the first conductive layer, the second transmission layer is connected to the first transmission layer, and the second substrate layer is connected to the first substrate layer.

2. The foldable electronic device according to claim 1, wherein the first conductive layer further comprises a first conductive adhesive layer located between the first conductive fabric and the dielectric layer.

3. The foldable electronic device according to claim 2, wherein the first conductive fabric comprises a first base layer and a conductive material arranged on the first base layer; and the first base layer is made of a polyester fiber, and a tensile strength of the first base layer is greater than 360 Mpa.

4. The foldable electronic device according to claim 3, wherein the conductive material is any one or more of copper, gold, and nickel, and a thickness of the first conductive layer is in a range of 0.01 mm to 0.1 mm.

5. The foldable electronic device according to claim 1, wherein the first transmission layer further comprises at least one first ground wire, at least one first ground wire is arranged on each of two sides of each of the at least one first signal line, and a distance between the first signal line and the first ground wire is greater than a distance between the first signal line and the first conductive layer.

6. The foldable electronic device according to claim 1, wherein the dielectric layer further comprises an insulating layer located between the first conductive layer and the first substrate layer.

7. The foldable electronic device according to claim 6, wherein the insulating layer comprises a first insulating adhesive layer, and the first insulating adhesive layer is located between the first conductive layer and the first substrate layer.

8. The foldable electronic device according to claim 6, wherein the insulating layer comprises an insulating fabric and a second insulating adhesive layer, the second insulating adhesive layer is located between the insulating fabric and the first substrate layer, and the insulating fabric is made of a polyester fiber.

9. The foldable electronic device according to claim 6, wherein the insulating layer comprises a foamed layer and a third insulating adhesive layer, and the third insulating adhesive layer is located between the foamed layer and the first substrate layer.

10. The foldable electronic device according to claim 9, wherein the foamed layer is a closed-cell foam, a semi-closed-cell foam, or a foamed material, and the foamed material is a composite material formed of polytetrafluoroethylene, polyurethane, or a copolymer of polytetrafluoroethylene and fluorinated ethylene propylene.

11. The foldable electronic device according to claim 6, wherein a thickness of the insulating layer is in a range of 0.04 mm to 0.1 mm, and a thickness of the first substrate layer is in a range of 0.012 mm to 0.025 mm.

12. The foldable electronic device according to claim 1, wherein a plurality of notches are provided on the first signal line, and the plurality of notches are arranged at intervals in a bending direction perpendicular to the first transmission assembly.

13. The foldable electronic device according to claim 1, wherein the second transmission layer and the first transmission layer are integrally arranged, the second substrate layer and the first substrate layer are integrally arranged, the first conductive layer is connected to a side of the first ground layer facing away from the second substrate layer, and a connection area between the first conductive layer and the first ground layer is greater than or equal to 20 $mm^2$.

14. The foldable electronic device according to claim 1, wherein a thickness of the dielectric layer is set such that a first distributed capacitance is formed between the first conductive layer and the first signal layer, and the first distributed capacitance causes an impedance of the first transmission assembly to match an impedance of the second transmission assembly.

15. The foldable electronic device according to claim 14, wherein when the impedance of the second transmission assembly is 50Ω, the thickness of each dielectric layer is set to 0.107 mm, a thickness of the first signal layer is 12 μm, and a dielectric constant ε of the dielectric layer is 2.9, and when a transmission frequency is 2000 MHz, the first distributed capacitance is formed between the first conductive layer and the first signal layer, and the first distributed capacitance causes the impedance of the first transmission assembly to be 50Ω.

16. The foldable electronic device according to claim 1, wherein a weaving density of the first conductive fabric of the first conductive layer is set such that a second distributed capacitance is formed between the first conductive layer and the first signal layer, and the second distributed capacitance causes an impedance of the first transmission assembly to match an impedance of the second transmission assembly.

17. The foldable electronic device according to claim 1, wherein a dielectric constant of the dielectric layer is set such that a third distributed capacitance is formed between the first conductive layer and the first signal layer, and the third distributed capacitance causes an impedance of the first transmission assembly to match an impedance of the second transmission assembly.

18. The foldable electronic device according to claim 17, wherein when the impedance of the second transmission assembly is 50Ω, the dielectric constant of the dielectric layer is set to 2, a thickness of each dielectric layer is set to 0.039 mm, and a thickness of the first signal layer is 12 μm, and when a transmission frequency is 2000 MHz, the third distributed capacitance is formed between the first ground layer and the first signal layer, and the third distributed capacitance causes the impedance of the first transmission assembly to be 50Ω.

19. A foldable electronic device, comprising:

a first structural member and a second structural member, wherein a bending area is formed between the first structural member and the second structural member;

the first structural member comprises at least a first circuit board, and the second structural member comprises at least a second circuit board; and a transmission assembly, wherein one end of the transmission assembly is connected to the first circuit board, and another end of the transmission assembly is connected to the second circuit board;

wherein the transmission assembly comprises a first transmission assembly, the first transmission assembly is configured for use in a bending area of the foldable electronic device, and the first transmission assembly comprises at least:

two first conductive layers and a first transmission layer located between the two first conductive layers;

each of the first conductive layers comprises at least a first conductive fabric, the first conductive fabric comprises a first base layer and a conductive material arranged on the first base layer, the first base layer is made of a polyester fiber, and the first transmission layer comprises at least one first signal line;

a dielectric layer is further arranged between the first conductive layer and the first transmission layer, and the dielectric layer comprises at least a first substrate layer; and the first conductive layer further comprises a first conductive adhesive layer, and the first conductive adhesive layer is located between the first conductive fabric and the dielectric layer, and is configured to bond the first conductive fabric to the dielectric layer, wherein the transmission assembly further comprises a second transmission assembly, wherein the second transmission assembly is connected to the first transmission assembly, and is configured for use in a non-bending area of the foldable electronic device;

the second transmission assembly comprises at least two first ground layers and a second transmission layer located between the two first ground layers, and the second transmission layer comprises a second signal line; and a second substrate layer is further arranged between each of the first ground layers and the second transmission layer, wherein the first ground layer is connected to the first conductive layer, the second transmission layer is connected to the first transmission layer, and the second substrate layer is connected to the first substrate layer.

* * * * *